United States Patent [19]
Bonkowski

[11] Patent Number: 5,237,796
[45] Date of Patent: Aug. 24, 1993

[54] METHOD AND APPARATUS FOR DIFFERENTIAL SOFTENING OF THERMOFORMABLE PLASTIC

[75] Inventor: Lorne Bonkowski, Stockton, Calif.

[73] Assignee: Forma-Pack, L.P., Stockton, Calif.

[21] Appl. No.: 897,890

[22] Filed: Jun. 12, 1992

[51] Int. Cl.[5] .................... B65B 21/00; B65B 27/04; B65B 53/02

[52] U.S. Cl. ........................................ 53/398; 53/411; 53/441; 53/442

[58] Field of Search ............... 53/398, 411, 441, 442, 53/453; 156/212, 245, 499

[56] References Cited

U.S. PATENT DOCUMENTS

| | | | |
|---|---|---|---|
| 3,473,286 | 10/1969 | Henry | 53/411 |
| 3,476,239 | 11/1969 | Jacob | 53/411 X |
| 3,800,497 | 4/1974 | Pearson | 53/411 |
| 4,122,790 | 10/1978 | Rowe et al. | 53/411 |
| 4,281,502 | 8/1981 | Bonkowski | 53/398 |
| 4,688,367 | 8/1987 | Bonkowski | 53/398 |
| 5,123,228 | 6/1992 | Bonkowski et al. | 53/398 |

Primary Examiner—Horace M. Culver
Attorney, Agent, or Firm—Spensley Horn Jubas & Lubitz

[57] ABSTRACT

The present invention provides a method and apparatus for differentially softening plastic used to package articles. Select areas of the sheet are selectively softened by treating those areas to allow either increased or decreased softening of the sheet in response to radiation absorption. The treatment can include the application of coating materials to the select areas or the lamination of different types of plastics. In the illustrated embodiment, heat is applied to the sheet by use of a infrared radiation source. Either before or after the sheet has been softened in the areas, the sheet is positioned adjacent to a forming plate for stretch forming the sheet. The plate causes the softened areas of the sheet, along with any unsoftened areas bordering the softened areas, to be drawn and stretched over and around the surface of the article intended to be covered or held. The softened portions of the sheet are then allowed to cool to their unsoftened, relatively rigid state, resulting in a carrier that covers the top and sides of each article.

12 Claims, 3 Drawing Sheets

METHOD AND APPARATUS FOR DIFFERENTIAL SOFTENING OF THERMOFORMABLE PLASTIC

DISCLOSURE DOCUMENT

This application relates to an invention disclosed in Disclosure Document No. 255,837, filed Jun. 12, 1990.

BACKGROUND OF THE INVENTION

(1) Field of the Invention

The present invention relates generally to a method and apparatus for differentially softening plastic for use in packaging of articles.

(2) Description of Related Art

U.S. Pat. Nos. 4,281,502, 4,688,367 and 5,123,228 to Bonkowski disclose various plastic carriers which package a plurality of articles such as beverage cans with a single sheet of thermoplastic material.

To form the carrier, selected areas of the sheet are first softened and then drawn down over the tops of the articles. When the sheet rehardens, the articles are firmly bound together. Such a carrier has been found to have a number of advantages. For example, the carrier can be designed to completely cover the tops of the articles which can protect the articles from dirt and contamination.

Typically, the portion of the sheet which is directly over the top of each article is selectively softened by the application of heat. U.S. Pat. Nos. 4,688,367 and 5,123,228 disclose that the heat may be applied by a heated platen or button which either contacts the areas or is brought into close proximity. U.S. Pat. No. 4,281,502 discloses that the heat may be applied by a radiant heater in conjunction with an insulating plate which acts to direct the heat to the appropriate areas. The heat transferred to the sheet softens the areas to permit subsequent stretching.

In both of these methods, the insulating plate and the heated platen should be carefully positioned relative to the sheet to ensure that the softened areas of the sheet are correctly located. A requirement for precision registration of the insulating plate or the heated platen to the thermoplastic sheet can increase the complexity and hence the expense of the packaging process, particularly in high speed operations.

SUMMARY OF THE INVENTION

It is the object of the present invention to provide an improved method and apparatus for differentially softening thermoformable plastic sheets for making carriers for articles, particularly in a manner requiring a relatively uncomplicated arrangement.

These and other objects are accomplished by using a sheet of material which is stretchable upon softening but otherwise relatively rigid. In accordance with one aspect of the present invention, select areas of the sheet are selectively softened by treating those areas to allow either increased or decreased softening of the sheet in response to radiation absorption. The treatment can include the application of coating materials to the select areas or the lamination of different types of plastics that have differing responses to the absorption of radiation.

In the illustrated embodiment, heat is applied to the sheet by use of a infrared radiation source. However, other energy sources, such as radio or microwave radiation, and ultrasound can also be used. The select areas of the sheet which have been treated may either absorb or reflect more radiation than the untreated areas even though all areas are exposed to the same radiation source. The areas which absorb more radiation, of course, become hotter than the remaining areas, and therefore soften more.

Either before or after the sheet has been softened in the desired areas, the sheet in the illustrated embodiment is positioned adjacent a forming plate for stretch forming the sheet. The forming plate causes the softened portion of the sheet, along with any non-softened areas bordering the softened portion, to be drawn and stretched over and around the surface of the article. The softened portions of the sheet are then allowed to cool to their unsoftened, relatively rigid state, resulting in a carrier that covers the top and sides of each article, thereby forming an effective cover and carrier.

BRIEF DESCRIPTION OF THE DRAWINGS

The foregoing objects, features and advantages of the invention will become more apparent from the following detailed description of the preferred embodiments taken in conjunction with the accompanying drawings, in which.

DESCRIPTION OF THE PREFERRED EMBODIMENTS

The following description is the best contemplated mode of carrying out the invention. This description is made for the purpose of illustrating the general principles of the invention and should not be taken in a limiting sense. The scope of the invention is best determined by reference to the appended claims. In the accompanying drawings, like numerals designate like parts in the figures.

Figure 1:
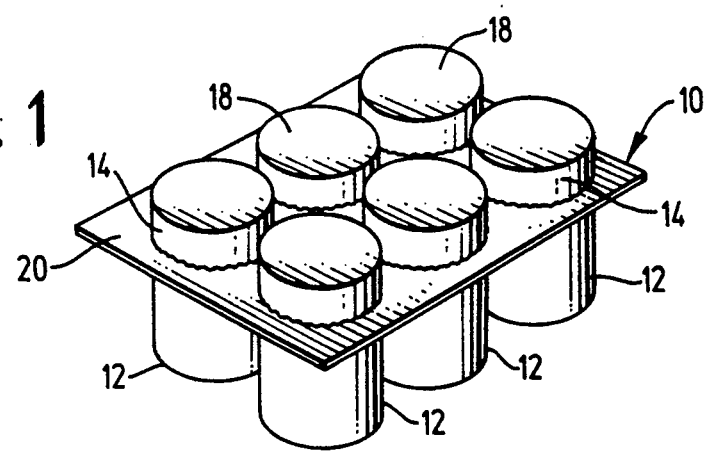
FIG. 1 is a perspective view of an array of containers interconnected by a carrier formed in accordance with the present invention.

FIG. 1 shows a carrier 10 which interconnects an array of six containers 12. The carrier 10 is formed by softening selected areas of a plastic sheet corresponding to tops of the containers 12 and forcing the sheet down over the tops of the containers 12. The carrier 10 thereby formed includes a side portion 14 which surrounds the upper part of the wall of each container 12, and a cover portion 18 located over the top of each container 12 in the array. The unsoftened portion of the sheet forms a skirt portion 20 extending from the bottom of the side portions 14 and interconnecting the containers 12.

As explained in greater detail below, the present invention provides a very advantageous method of softening only those portions of the plastic sheet desired to be softened prior to forming the carrier over the tops of the containers. Of course, the invention is not limited to carriers for containers. In general, any article which requires a protective covering over one or more ends (such as a hermetically sealed jar), isolation from another article for purposes such as shipping (e.g., light bulbs), or is conveniently packaged, shipped, or sold in multiples may employ the apparatus and method of making the carrier of the present invention. In addition, the carrier 10 may be employed to provide a protective or supportive covering for a single article.

Figure 2:
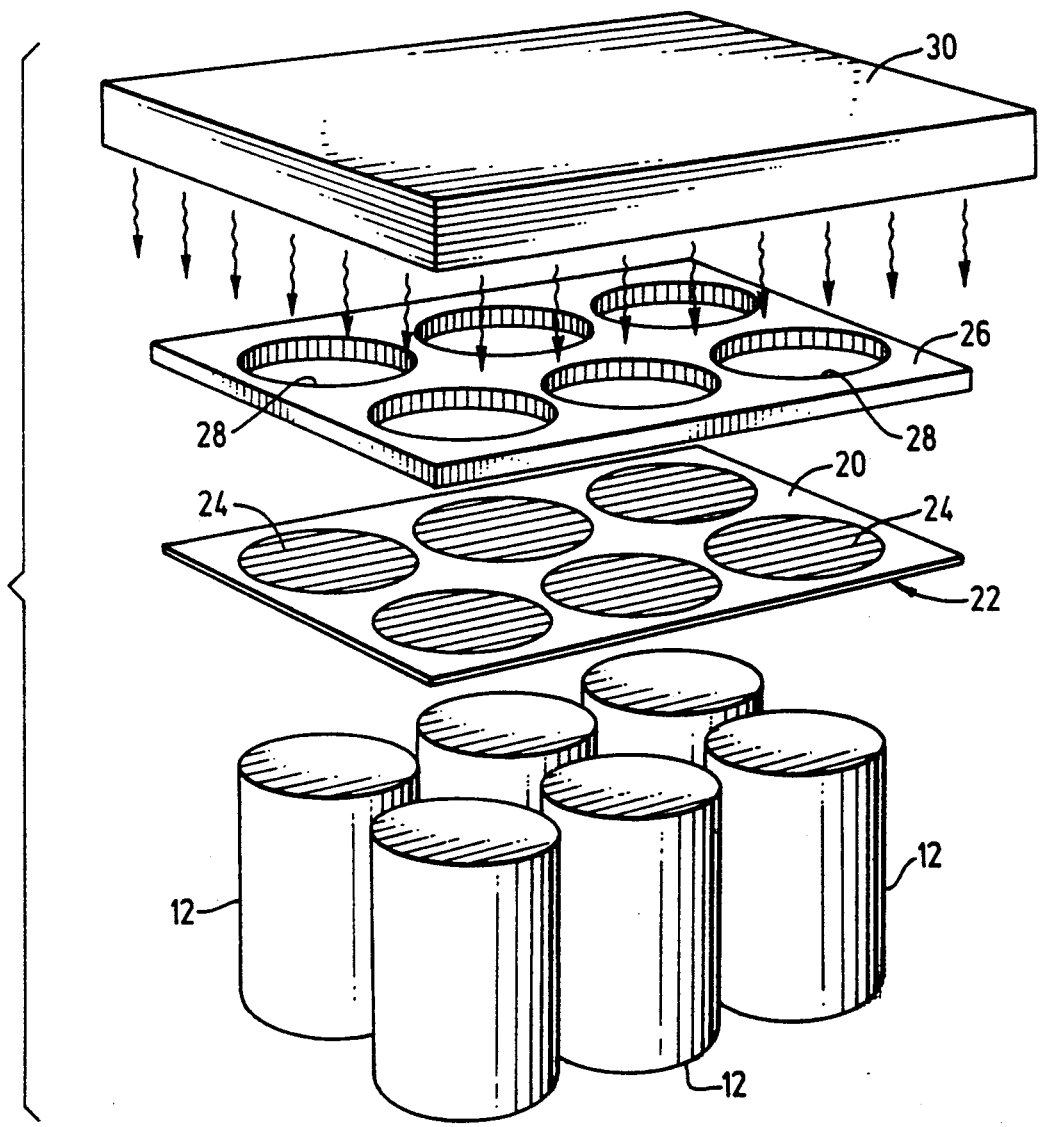
FIG. 2 is a perspective view of a plastic sheet which has been coated in select circular areas located directly above containers, an infrared heat source used to heat the sheet, and a forming plate used to draw and stretch the softened sheet over the containers.
Figure 3:
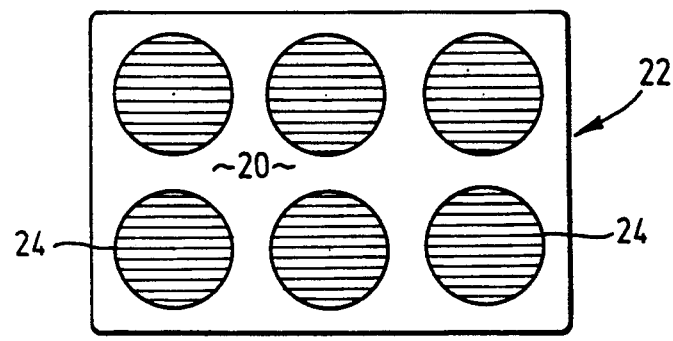
FIG. 3 is a plan view of a plastic sheet which has been treated in a set of circular areas with a substance that increases the absorption of infrared radiation of the sheet.

Referring to FIGS. 2-6, a method in accordance with the present invention for making the carrier 10 will be now described. As shown in FIG. 2, the carrier 10 is formed from a single flat piece or sheet of stock 22 (hereinafter the "sheet 22") which is preferably made of material which is normally relatively rigid, but may be softened by heating and then stretched and allowed to cool. Upon cooling, the material returns to its unsoftened state and remains in its stretched configuration. Many suitable materials are available. For example, thermoformable plastics, such as high density polyethylene, polyethylene teraphalate (PET), polyvinyl chloride or polypropylene, may be used.

To facilitate in the formation process of the carrier 10, it is preferable to soften only those areas 24 of the sheet 22 which will actually be stretched over the tops of the containers. In accordance with the present invention, the sheet 22 is first treated with a substance only in those select areas 24 which correspond to the positions of the tops of the set of containers 12 which are to be interconnected. In the illustrated embodiment, the substance is preferably a coating material having radiation absorption characteristics which are greater than that of the sheet 22. The sheet 22 is then irradiated from a source of electromagnetic radiation such as an infrared source 30. Those areas 24 treated with the substance will consequently absorb more infrared radiation than the surrounding area 20 such that only the treated areas 24 will be heated sufficiently to be substantially softened by the infrared source. For example, a thin coating of ink printed on the surfaces 24 of a sheet of PET will cause the printed areas 24 to soften to a far greater extent than the surrounding unprinted area of the PET material, even though all areas are exposed to the same infrared radiation source.

In the illustrated embodiment, the radiation source 30 preferably emits energy primarily at a wavelength to which the sheet 22 is "transparent". For example, T-3 quartz tungsten-filament lamps emit the majority of their energy at wavelengths shorter than 3 micrometers ($\mu$m). At these short wavelengths, many plastics are generally "transparent" to these short wavelengths and as a consequence, absorb relatively little energy from a T-3 lamp. If a filter is added to the lamp to eliminate wavelengths longer than 2.5 $\mu$m, even less energy will be absorbed by the plastic. Another suitable heater which produces very little long wavelength energy is a "halogen burner" used in some modern cooking elements. Although the following description generally contemplates heating the sheet 22 with infrared radiation, microwave or radio radiation, or ultrasound also can be used. In addition, any other source of electromagnetic radiation that will adequately soften the sheet is also suitable.

In the illustrated embodiment, plastic materials for the sheet 22 which are generally transparent to the short wavelength of energy supplied by a T-3 lamp or halogen burner are preferred. For example, PET material absorbs energy and is thereby heated and softened when excited with energy in the ranges of 2.8 to 3.3 $\mu$m at 7.95 $\mu$m, and a range of 8 to 14 $\mu$m, and is virtually transparent to all other wavelengths. Other plastics suitable for use with infrared heat sources may have different specific absorption spectrums but preferably should be "transparent" to the very short wavelengths. Since a sheet 22 made of the PET plastic material is transparent to most of the radiation emitted by the filtered T-3 source 30, the untreated portion of the sheet 22 will be heated and softened very little. Consequently, a coating of ink, paint or other radiation absorbing materials may be applied to the sheet 22 to precisely define those areas which are intended to be softened. For example, the areas 24 of FIG. 3 have been printed with ink to each have a round shape corresponding to the top of a beverage can. Furthermore, each printed area 24 is precisely positioned in a two-by-three array to register with the tops of the array of containers 12 of FIG. 2. The chemical composition of the ink or paint is one that preferably absorbs energy in the range smaller than 3 $\mu$m very efficiently. Virtually all common permanent marking inks such as those marketed under the tradename "Marksalot" have this capacity.

When a piece of PET plastic which is printed as above is exposed to the T-3 lamp, the areas 24 which are coated with the ink are "opaque" and these absorb the energy emitted by the lamp. As a consequence, the plastic area directly underlying each printed area 24 heats up at a substantially increased rate as compared to the surrounding area which is not coated and is still "transparent" to the energy. The net result is to heat and soften each area within the plastic sheet defined by the shape and size of the area that was printed by the ink. Consequently, the size, shape and positions of the heat softened areas are precisely controlled by printing the desired areas on the plastic with the heat absorbing ink. Thus, a separate mask or a heated platen or button to define the softened areas is not needed.

When the sheet 22 has been softened to the proper extent, a forming plate 26 (FIG. 2) engages the sheet 22 and forces it over the tops of the containers 12 with each opening 28 in the forming plate 26 receiving a corresponding container 12. The pressure of the forming plate 26 on the unsoftened portion of the sheet 22 causes the softened portion to be drawn tightly over and around the sides of each container 12, Thus, the containers 12 act as mandrels around which the softened sheet 22 is drawn and conformed.

After the sheet 22 has conformed to the containers 12, the forming plate 26 is removed. Since heat is no longer being applied, the sheet 22 hardens and remains in the desired shape and location over the containers 12. The sheet material may tend to contract slightly during hardening. Being closely conformed about the containers 12, it tightly grips the top portion of the containers 12. When the sheet 22 returns to its original unsoftened state, the process is complete and an effective one-piece carrier is provided in a simple, effective, and economical manner.

It is recognized that the forming plate 26 in the process illustrated in FIG. 2 may perform a coarse masking function to block infrared radiation from portions of the untreated areas 20 of the sheet 22 during the heating and softening stage. However, because the softened areas are precisely defined by the printed areas 10 24, any coarse masking provided by the forming plate 26 is not critical to the process. Accordingly, the apertures 28 of the forming plate 26 need not be precisely registered with the sheet 22. Indeed, the forming plate 26 can be eliminated during the heating and softening stage if the coarse masking is not desired.

In accordance with a specific example of a preferred process and package, a piece of 8 mil (0.008 in.) PET plastic is first coated with a dark colored, quick-drying, permanent marking ink of the type commonly used in graphics, over an area the same shape as, and slightly smaller than, the top of the article to be covered or packaged, for example, a 2.2 inch diameter disk for a 2.4 inch diameter beverage can top. The plastic sheet is then "heated" under an energy source emitting very short frequency infrared such as that emitted by a commercial T-3 lamp. Typically, the distance from the heat source to the plastic would be about 2 inches. When the area which has been printed upon is softened to thermoform temperature (about 4 to 6 seconds of heating), the plastic sheet is forced over the tops of the container using the surrounding un-softened areas of the plastic engaged by the plate 26 which has corresponding holes 28 for each can top (about 2.5 inches in diameter).

Figure 4:
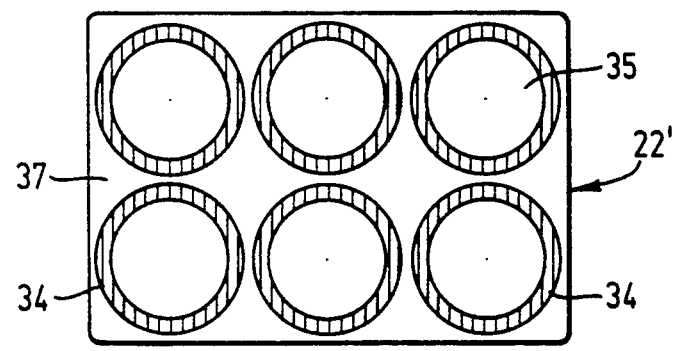
FIG. 4 is a plan view of a plastic sheet which has been treated in a set of ring shaped areas with a substance that decreases the absorption of infrared radiation of the sheet.

It should be appreciated that processes or coatings may also be utilized which increase the reflectance of energy away from a surface. Thus, an alternative to causing differential heating by the method above would be to coat an area with "reflective" ink and then use a heat source, such as a "long-infrared" source, radiating at 3 to 14 μm, to efficiently heat the plastic sheet left uncoated. For example, FIG. 4 illustrates a thermoformable plastic sheet 22' which has been treated in ring-shaped select areas 34 with a coating or laminated plastic which reflects radiation or otherwise is less infrared radiation sensitive than the sheet 22' to protect these areas 34 from the influence of long wave radiation. In this embodiment, the interior areas 35 inside the rings 34 will be softened by exposure to the long wave infrared radiation. The surrounding area 37 outside these ring-shaped areas 34 will be protected by the shape of the forming plate 26 itself (shown in FIG. 1). Thus, the areas 34 and 37 will not be softened.

Figure 5:
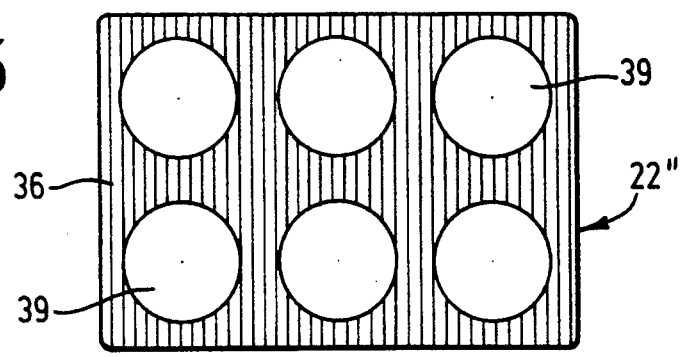
FIG. 5 is a plan view of a plastic sheet which has been treated in areas surrounding a set of circular areas with a substance that decreases the absorption of infrared radiation.

FIG. 5 shows another embodiment where area 36 is protected from infrared radiation softening by application of an infrared radiation reflective or insensitive material. In this embodiment, the use of the forming plate as a mask is unnecessary. The untreated set of circular areas 39 will soften at a greater rate than the treated areas 36 so that areas 39 can conform to the shapes of the containers 12 (shown in FIG. 1).

Figure 6:
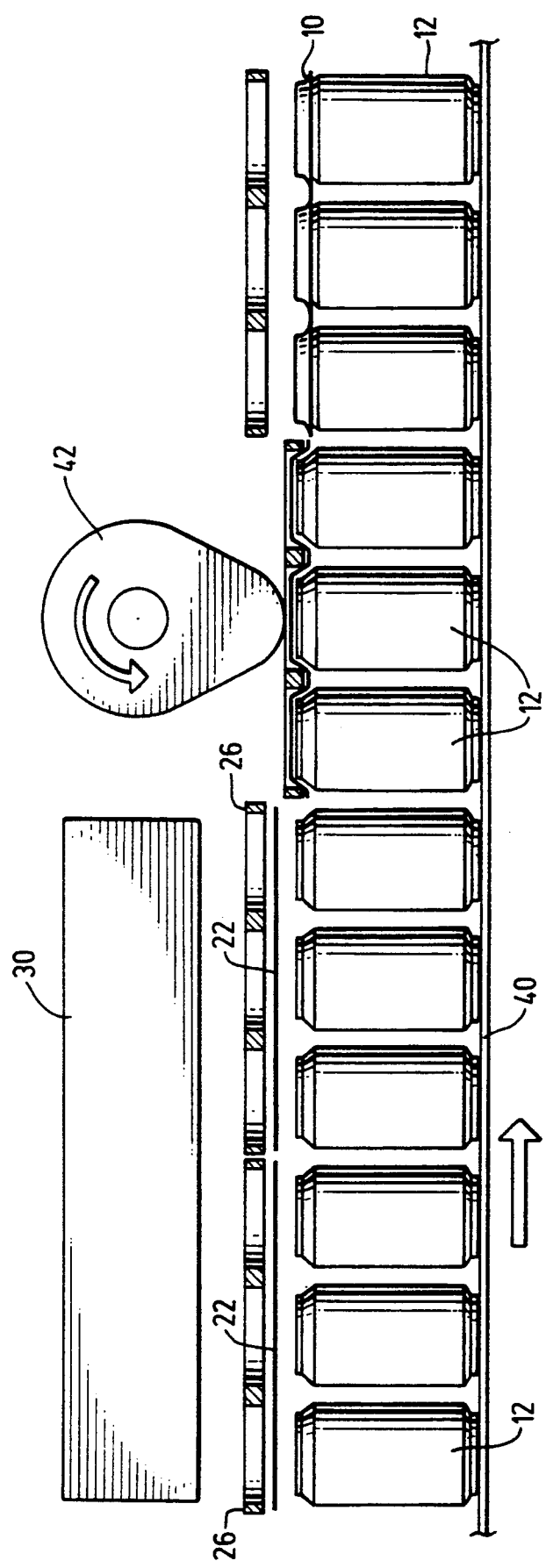
FIG. 6 is an elevation view of a machine which may used to make a carrier in accordance with the present invention.

Referring now to FIG. 6, one embodiment of a machine for forming a carrier 10 is shown. Cans 12 proceed along a continuously moving conveyor 40. A series of forming plates 26 also move at a speed which matches the conveyor. Sheets of plastic 22 which have the IR absorbing areas printed in the areas where the cans will be formed into the plastic are also moved along in registration to the cans and coarse registration to the forming plates. A general heat source 30 is used to soften the IR sensitive area within each sheet for several seconds as sets of sheets 22, cans 12 and forming plates 26 proceed down the conveyor. A cam actuator 42 is positioned over the conveyor to cause the advancing forming plates to be sequentially pushed DOWN over the tops of the cans as they go by, thereby stretching the softened portion of the plastic over the can tops and forming the carrier 10. Following through the forming action, the cam actuator allows the forming plate to rise again. Once the plastic cools the final cover/carrier is finished.

It is seen from the above that the present invention provides a unique method and apparatus for selectively softening predetermined areas of a thermoplastic sheet which greatly facilitate the formation of a carrier from the sheet. Because the treated areas which define the areas to be softened can be printed in advance with ink or other energy absorbing materials, the heat source need not be specially aligned with respect to the sheet. Thus, the need for special heat masks or heat plates which often require precise registration with the sheet can be eliminated. Furthermore, most printing processes readily allow the sheets to be printed in large quantities with each printed area being precisely located on the sheet.

It will of course be understood that modifications of the present invention, in its various aspects, will be apparent to those skilled in the art, some being apparent only after study and others being matters of routine mechanical and chemical design. For example, paint such as enamel or lacquer spray paint may be substituted for ink as the treating material. Similarly, the "treated areas" of the thermoplastic sheet may comprise a plastic material having different energy absorbing properties from that of the "untreated areas". Other embodiments are also possible. As such, the scope of the invention should not be limited by the particular embodiments herein described but should be defined only the appended claims and equivalents thereof.

I claim:

1. A method of forming a carrier for carrying a plurality of articles, the method comprising the steps of:
    treating predetermined areas of a sheet of thermoplastic material with a radiant energy absorbing material, said predetermined areas being positioned relative to each other to correspond to the relative positions of the plurality of articles to be carried;
    radiating the sheet with energy so that the treated areas are softened relative to the untreated areas; and
    forming the softened, treated areas of the sheet about the tops of the articles to form the carrier.

2. The method of claim 1 wherein the treating material is an ink which absorbs infrared radiation.

3. The method of claim 1 wherein the articles to be carried are beverage containers.

4. The method of claim 3 wherein the treated areas are shaped to conform to the tops of the beverage containers.

5. The method of claim 4 wherein the treated areas are arranged in a two by three array.

6. A method of forming a carrier for carrying a plurality of articles, the method comprising the steps of:
    treating a sheet of thermoplastic material with a radiant energy reflective material leaving predetermined untreated areas of the sheet, said predetermined untreated areas being positioned relative to each other to correspond to the relative positions of the plurality of articles to be carried;
    radiating the sheet with energy so that the untreated areas are softened relative to the treated areas; and forming the softened, untreated areas of the sheet about the tops of the articles to form the carrier.

7. A method of forming a carrier for carrying a plurality of articles, the method comprising the steps of:
radiating with energy a sheet of thermoplastic material having predetermined areas of the sheet which have been treated with a radiant energy absorbing material so that the treated areas are softened by the energy relative to the untreated areas, said predetermined areas being positioned relative to each other to correspond to the relative positions of the plurality of articles to be carried; and
forming the softened, treated areas of the sheet about the tops of the articles to form the carrier.

8. The method of claim 7 wherein the treating material is an ink which absorbs infrared radiation.

9. The method of claim 7 wherein the articles to be carried are beverage containers.

10. The method of claim 9 wherein the treated areas are shaped to conform to the tops of the beverage containers.

11. The method of claim 10 wherein the treated areas are arranged in a two by three array.

12. A method of forming a carrier for carrying a plurality of articles, the method comprising the steps of:
radiating with energy a sheet of thermoplastic material treated with a radiant energy reflective material and having predetermined untreated areas of the sheet so that the untreated areas are softened by the energy relative to the treated areas, said predetermined untreated areas being positioned relative to each other to correspond to the relative positions of the plurality of articles to be carried; and
forming the softened, untreated areas of the sheet about the tops of the articles to form the carrier.

* * * * *